United States Patent
Kobayashi et al.

[15] 3,664,243
[45] May 23, 1972

[54] APPARATUS FOR INTERLOCKING A SHUTTER RELEASE WITH EXPOSURE METER SETTINGS

[72] Inventors: Tatsuo Kobayashi, Kaizuka-shi; Keisuke Maeda, Osaka-shi, both of Japan

[73] Assignee: Minolta Camera Kabushiki Kaisha, Osaka, Japan

[22] Filed: Oct. 10, 1969

[21] Appl. No.: 865,451

[52] U.S. Cl. ............................................. 95/10 C, 95/64 R
[51] Int. Cl. ...........................................................G03b 7/02
[58] Field of Search .........................................95/10 C, 64 R

[56] References Cited
UNITED STATES PATENTS
3,078,772  2/1963  Goshima..............................95/10 C Primary Examiner—Samuel S. Matthews
Assistant Examiner—Michael L. Gellner
Attorney—Watson, Cole, Grindle & Watson

[57] ABSTRACT

Apparatus to prevent actuation of a camera shutter release in accordance with underexposed and overexposed settings of an exposure meter. Movement of the shutter mechanism is prevented by its engagement with an arresting member rotated into operative position by movement of pointer locking apparatus having sloping edges at respective end portions thereof for receiving the pointer when it indicates underexposed and overexposed conditions.

6 Claims, 10 Drawing Figures

Patented May 23, 1972

3,664,243

INVENTORS
Tatsuo Kobayashi and
Keisuke Maeda
BY
Watson, Cole, Grindle & Watson
ATTORNEYS Patented May 23, 1972

INVENTORS
Tatsuo Kobayashi and
Keisuke Maeda
BY
Watson, Cole, Grindle & Watson
ATTORNEYS

APPARATUS FOR INTERLOCKING A SHUTTER RELEASE WITH EXPOSURE METER SETTINGS

BACKGROUND OF THE INVENTION

In well known prior art cameras, a pointer restraining plate is moved by a shutter release member, and if the pointer of an exposure meter is within the EE interlocking range, the pointer restraining plate moves in a small stroke. However, if the pointer is outside the EE interlocking range a notched step provided on the pointer restraining plate engages the pointer and the stroke of the pointer restraining plate is enlarged. The difference of the stroke the effects a switching operation for energizing a warning lamp and initiates the release of a locking operation.

According to such a system, when the pointer is near the boundary of the EE interlocking range it is impossible to judge directly from the position of the meter pointer which range the pointer is indicating and also impossible to discriminate clearly whether the release of the locking operation is caused by a defective shutter mechanism, incomplete self-cocking of the shutter mechanism, or the fact that the object conditions are indeed outside the EE interlocking range.

SUMMARY OF THE INVENTION

The present invention is so constructed that the pointer arresting member is interlocked with the shutter release member at the beginning of operation of the shutter release member, if the pointer is within the exposure meter interlocking range where the pointer can be positively restrained by check edge of the pointer arresting member. If the pointer is in a position outside a restrainable range, the pointer is moved farther in the direction outside the interlocking range and separated from a borderline setting position through an interlocking engagement with the pointer arresting member.

The primary object of the present invention is to provide an improved interlock mechanism for preventing activation of the shutter release mechanism in accordance with undesirable or unsatisfactory operating conditions as indicated by the position of an exposure meter pointer.

The second object of the present invention is to provide positive operation of a warning device for indicating the aforesaid unacceptable operating conditions.

The third object of the present invention is to provide positive displacement of the exposure meter pointer to indicate undesirable operating conditions if the exposure meter pointer occupies a borderline position.

BRIEF DESCRIPTION OF THE DRAWINGS

FIGS. 1,2 and 3,4 show respective embodiments of a shutter release mechanism interlocked with an exposure meter in accordance with the present invention, wherein:

FIG. 1 is a front view of the essential parts at the time when the pointer is within the exposure meter interlocking range.

FIG. 2 is a front view of the essential parts of the embodiment of FIG. 1 at the time when the pointer is outside the exposure meter interlocking range.

FIG. 3 is a front view of a modified embodiment.

FIG. 4 is a front view of the essential parts at the time when the pointer is outside the exposure meter interlocking range in the embodiment shown in FIG. 3.

Figure 5:
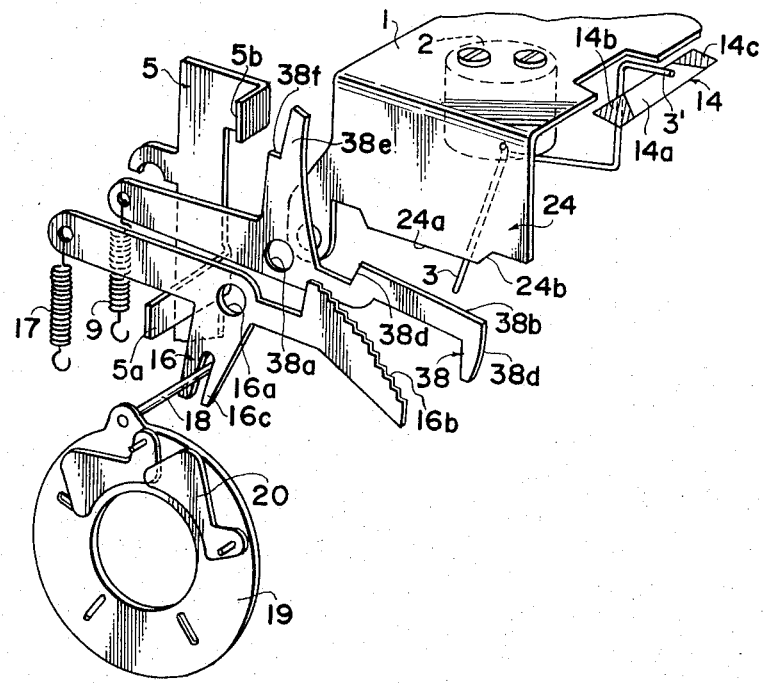

FIGS. from 5 to 10 show a third embodiment of a shutter release mechanism interlocked automatically with an exposure meter in accordance with the present invention, wherein:

FIG. 5 is a perspective view showing the general arrangement of essential parts.

Figure 6:
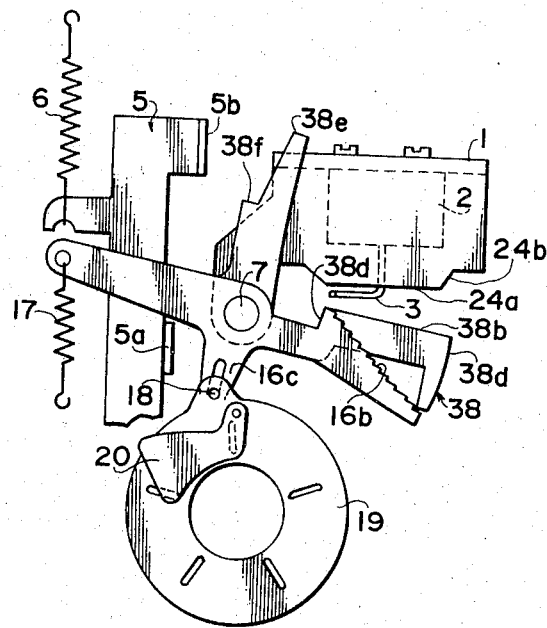

FIG. 6 is a front view illustrating the position of the parts prior to the release effected in FIG. 5.

Figure 7:
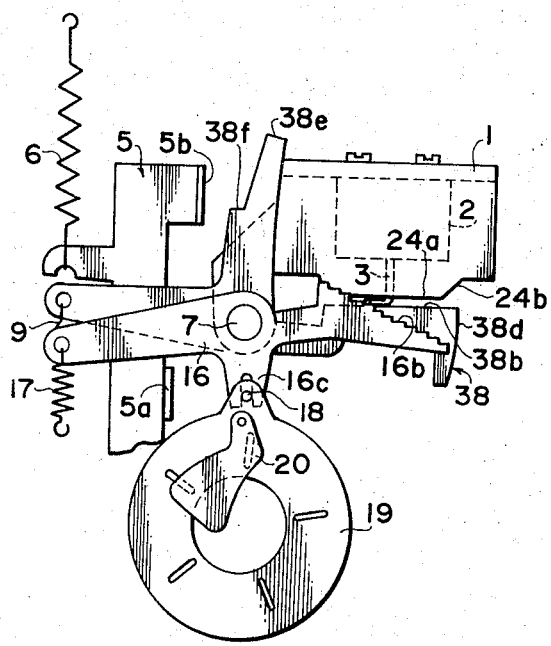

FIG. 7 is a front view showing the situation after the first stage operation of the release is finished at the time when the pointer is within the EE interlocking range.

Figure 8:
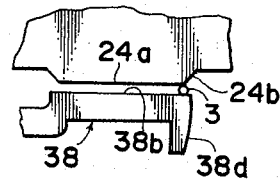

FIG. 8 is a front view showing the relative disposition of the pointer, the pointer receiver, and the pointer arresting member at the time when the pointer is outside the EE interlocking range.

Figure 9:
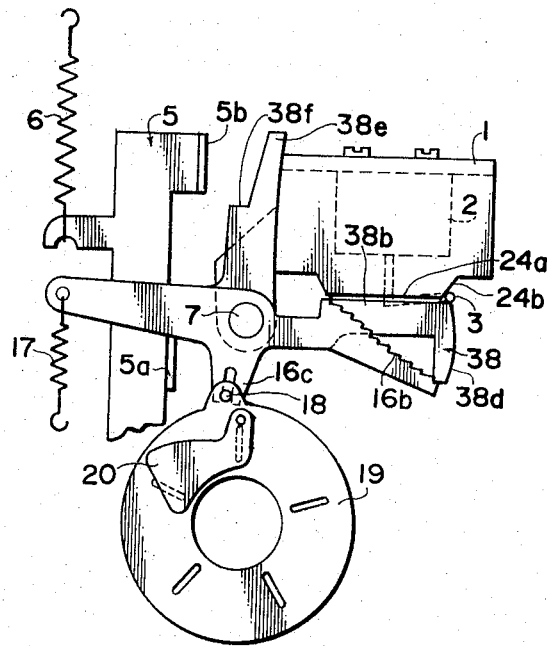

FIG. 9 is a front view showing the relative disposition of the parts in the operation of the first stage of the locking.

Figure 10:
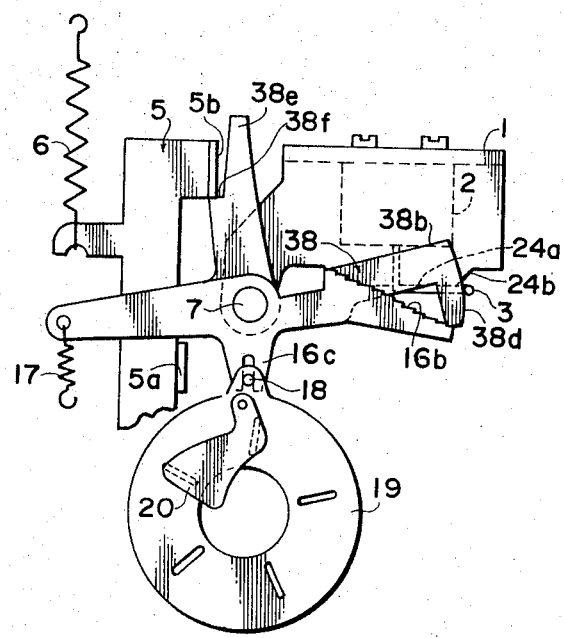

FIG. 10 is a front view showing the position of the elements after the first stage operation of the locking is finished and the release lock is effected.

DESCRIPTION OF THE PREFERRED EMBODIMENT

Figure 1:
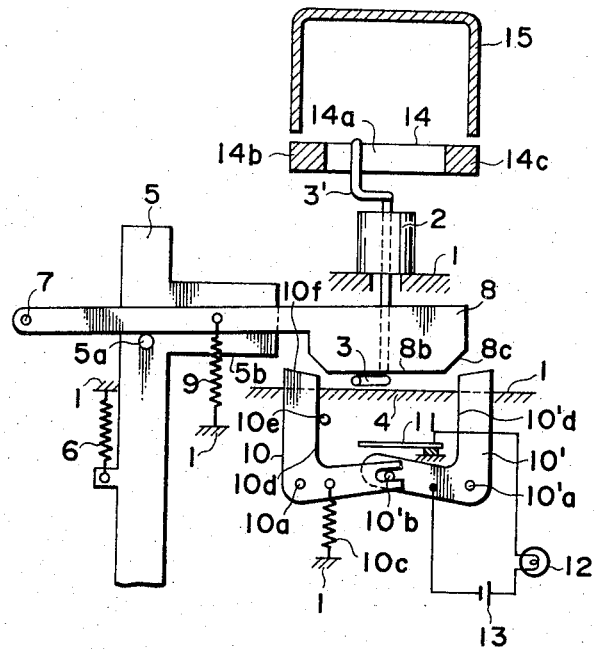
Figure 2:
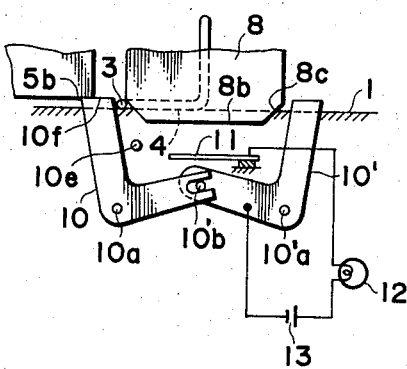

FIG. 1 and FIG. 2 show an embodiment of a shutter release interlocked with an exposure meter in accordance with the present invention, wherein reference numeral 1 represents fixed integral parts of the main body of the camera. Meter 2 is mounted to the camera body and the pointer 3 thereof can move along pointer receiver 4 fixed to the main body of the camera. Another pointer 3' also can move along dial 14 of the exposure meter provided in the finder. On dial 14 there are indicated daylight photographing range 14a, range 14b for showing the flash range because the brightness of an object is insufficient, and range 14c where the daylight photographing interlocked with the exposure meter is impossible because the brightness of an object is too great.

Shutter release rod 5 is retained so as to be vertically movable relative to the main body of the camera, and biased in an upward direction by means of return spring 6, and provided with connecting projection 5a and check edge 5b.

Pointer arresting member 8 is pivoted on the main body of the camera by means of spindle 7, engages with said connecting projection 5a, and is biased in a clockwise direction by means of tension spring 9. In an elevated position, pointer arresting member 8 provides clearance for movement of pointer 3 relative to pointer receiver 4, is provided with check edge 8b substantially parallel to pointer receiver 4, and has sloping edges 8c at both ends thereof. And, when another pointer 3' is within the exposure meter interlocking range 14a on dial 14, pointer 3 is right below check edge 8b. When pointer 3' is within the exposure range indicated by portion 14b, pointer 3 is located below left sloping edge 8c. Further when pointer 3' is within the overexposure range 14c, pointer 3 is located below right sloping edge 8c.

In front of pointer receiver 4, two L-shaped lock levers 10, 10' are connected respectively by pins 10a, 10'a to the main body of the camera and the horizontal arms of both lock levers 10, 10' partially overlap each other as illustrated in FIGS. 1 and 2.

Pin 10'b on one arm of lock lever 10' engages with the forked portion of one arm of lock lever 10, and is positioned above the end of the horizontal arm of lock level 10'. Contact piece 11 for operating a warning circuit comprising serially interconnected warning lamp 12 and power source 13 is insulatingly mounted to the main body of the camera. Spring 10c is provided between the other lock lever 10 and the main body of the camera and biased clockwise so as to allow inside edge 10d of the vertical arm of lock lever 10 to stop near the root portion of sloping edge 8c of the pointer arresting member by engagement with graduating pin 10e. On the outside end of the upper edge of lock lever 10 an engaging portion 10f is formed and when lock lever 10 turns counter-clockwise, engaging portion 10f engages check edge 5b to stop the downward movement of shutter release rod 5.

As shown in FIG. 1 pointer 3 is right below check edge 8b in the exposure meter interlocking range and check edge 8b of pointer arresting member 8 arrests the pointer between itself and pointer receiver 4 through the first stage of the stroke caused by the depression of release rod 5. The exposure of the exposure meter is indicated on dial 14 in finder 15, and corresponding to such indication the diaphragm or shutter speed is set manually or automatically by means known to the art and not illustrated and then by pressing down release rod 5 the shutter is released.

In the case where pointer 3 is outside the exposure meter interlocking range, when pointer arresting member 8 descends through the first stage stroke caused by the drepression of release rod 5, as shown in FIG. 2 and provided pointer 3 is right below left sloping edge 8c, that sloping edge 8c pushes pointer 3 to the left and pointer 3 presses inside edge 10d of L-shaped lock lever 10 to turn it counterclockwise so as to allow engaging portion 10f to engage with check edge 5b to prevent further downward movement of release lever 5. On the other hand, the end of the horizontal arm of the other lock lever 10' comes into contact with contact piece 11 to operate warning lamp 12, and at the same time the turning thereof is stopped and accordingly release rod 5 is locked.

Continuing with the description of the former operation, pointer 3 is pushed to the left, and at the same time pointer 3' is also moved in the same direction to be within range 14b on dial 14, and thus the camera operator can more definitely confirm that interlocking with the exposure meter is impossible.

Figure 3:
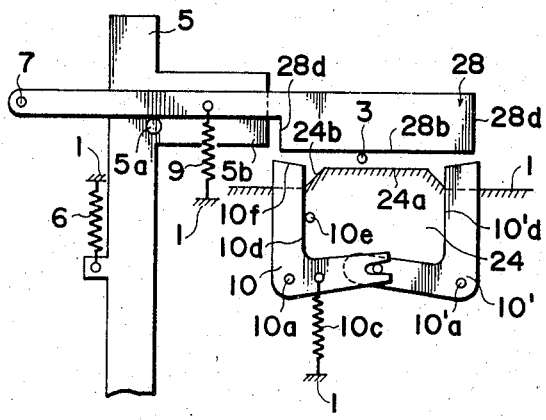
Figure 4:
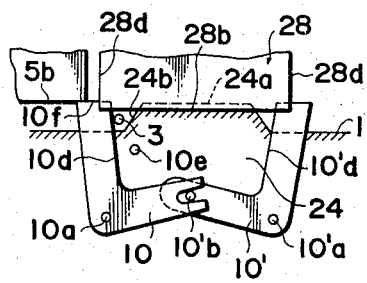

In another embodiment shown in FIG. 3 and FIG. 4, the sloping edge is provided on the pointer receiver instead of on the pointer arresting member as in the above-mentioned embodiment.

That is, check edge 28b of pointer arresting member 28 is flat and pointer receiver 24 facing check edge 28b is formed with pointer receiving surface 24a and sloping edges 24b on the right and left sides, thereof. Pointer 3' and the warning lamp circuit are not shown in FIG. 3 and FIG. 4, but can be included therein if desired the same reference symbols are used to indicate identical parts.

In FIGS. 5 to 10, a third embodiment of a shutter release mechanism interlocked automatically with an exposure meter in accordance with the present invention is shown, wherein the same reference symbols indicate the same members to provide the same function as described above.

Pointer arresting member 38 is pivoted on spindle 7 in spindle hole 38a and is biased counter-clockwise by means of spring 9 to be oppositely disposed to pointer receiving surface 24a formed with sloping edges 24b on both ends thereof. Check edge 38b is slightly wider than pointer receiving surface 24a and cut down edges 38d have an arcuate shape on both ends thereof. On the upper part of pointer arresting member 38 there is provided check projection 38e formed with check portion 38f which rotates to enter and retract from engagement with check edge 5b to prevent further downward movement release rod 5.

In front of pointer arresting member 38, scanning member 16 is pivoted on spindle 7 in spindle hole 16a and biased counter-clockwise by means of spring 17. Scanning member 16 is formed with step-shaped scanning edge 16b facing pointer receiver 24 and also forked portion 16c for adjusting the camera diaphragm.

In said fork portion 16c for adjusting the diaphragm there is fitted the end of connecting pin 18 mounted on diaphragm ring 19 supported rotatably relative to the camera main body, and the guide slots on said diaphragm ring 19 are coupled with diaphragm plates connected to the diaphragm ground plate (not shown in the drawings) by means of pins.

Pointer arresting member 38 and scanning member 16 normally rest on connecting projection 5a of release rod 5, and by means of return spring 6 check edge 38b and scanning edge 16b are in retracting positions leaving spaces respectively relative to pointer receiving surface 24a to enable pointer 3 to be moved to the right and left below pointer receiving surface 24a.

Therefore, when release rod 5 is not depressed, as shown in FIG. 6, pointer 3 turns in accordance with the brightness of the object.

Provided that pointer 3 is right below pointer receiving surface 24a as shown in FIG. 7, as release rod 5 is depressed pointer arresting member 38 turns counter-clockwise and check edge 38b comes into contact with pointer 3 to press it against pointer receiving surface 24a and stop the movement of the pointer. Then, scanning member 16 turns also counter-clockwise and one of the steps of scanning edge 16 comes into contact with the pointer and stops there. That is, corresponding to a turning position of pointer 3 the turning angle of the scanning member varies in accordance with which steps thereof contact the pointer, and when the brightness of the object is too dim the turning angle is small and when it is bright the the turning angle is large. Therefore, turning angle of diaphragm ring 19 also varies to stop diaphragm plate 20 at the proper diaphragm setting. Then, by further depressing the release rod the shutter is released.

Next, when the brightness of the object is too dim or too bright and the pointer is outside the interlocking range, for example, as in the overexposed condition shown in FIG. 8, and provided that the pointer is located below the right sloping edge 24b of pointer receiver 24, the first stage stroke caused by depressing release rod 5 brings check edge 38b of pointer arresting member 38 into contact with pointer 3 to press it against sloping edge 24b as shown in FIG. 9, so that pointer 3 is pushed out to the right along the sloping edge up to the end of check edge 38b. When pointer arresting member 38 is further turned, as shown in FIG. 10 pointer 3 slides on cut down edge 38d, and pointer arresting member 38 turns through a greater angle as compared with the interlocking situation previously described, so that check portion 38f engages check edge 5b of release rod 5, and, before the shutter is released locking is effected so as to check further movement of release rod 5.

As described above, when the pointer 3 is near the boundary of the EE interlocking range, and if the pointer is located below sloping edge 24b it is pushed out to the end and locking, as described above, is positively effected. Meanwhile, pointer 3' (shown clearly in FIG. 5) is also pushed away from somewhere near the boundary between the interlocking range 14a on dial 14 and range 14c to the end of range 14c, so that the camera operator can confirm clearly that pointer 3' is outside the interlocking interlocking range due to the overexposure condition, and accordingly a countermeasure can be employed, for example, providing a UV filter or the like over the camera lens.

The above-mentioned description is explained for the case of an overexposure condition, however, it is to be understood that an underexposure condition will result in a similar operation.

By the way, as shown in FIG. 10 the locking of the shutter release mechanism can be so provided that scanning member 16 is locked so as to prevent it from turning before it engages pointer 3.

The embodiments mentioned above are explained only for the case where the pointer is within the EE interlocking range and the scanning member adjusts the diaphragm corresponding to the position of pointer so as to effect the interlocking, however, it is also possible to effect such interlocking by permitting the turning angle of the pointer arresting member to vary in accordance with the position of the pointer, or by varying the exposure by adjusting the speed of the shutter as well as the diaphragm setting by means of the scanning member.

What is claimed is:

1. Apparatus for interlocking a shutter release mechanism in accordance with the position of an exposure meter pointer in a photographic camera, comprising;
    said shutter release mechanism including a shutter release member for actuating said camera, said pointer is movable in accordance with the brightness of an object between positions representing overexposure and underexposure,
    a pointer locking means for engaging said pointer only in a range of movement thereof defined by said underexposed and overexposed conditions, said pointer locking means having a sloping edge at each end portion thereof and further including an arresting member rotatably mounted to said camera,
    a respective one of said sloping edges engaging said pointer in respective extreme position ranges thereof each outside of said range of movement and whereby said pointer arresting member is rotated to stop movement of said shutter release member and prevent actuation of said shutter release mechanism.

2. Apparatus as in claim 1 further comprising indicator means including a pointer connected to more with the movement of said meter pointer to provide a visual indication of the position of said meter pointer in each of its respective position ranges.

3. Apparatus as in claim 1 further comprising a warning circuit including a warning light and a switch contact, and wherein said pointer locking means includes two rotatably mounted members each including arms having surfaces at the ends thereof and each extending to be in opposed relationship to a respective sloping edge of said pointer arresting member for engaging with said pointer, and each said member further including additional arms pivotally mounted to said camera, whereby engagement of one of said surfaces with said pointer rotates one of said members to actuate said switch contact and operate said warning light.

4. Apparatus as in claim 3 wherein said pointer locking means further includes a pointer receiver member fixedly mounted to said camera body in opposing relationship to said pointer arresting member, said sloping edge at each end portion is formed on the end portions of said pointer arresting member, and rotation of said pointer arresting member is initiated by a partial movement of said shutter release member.

5. Apparatus as in claim 3 wherein said pointer locking means further includes a pointer receiver member fixedly mounted to said camera body in opposing relationship to said pointer arresting member, said sloping edge at each end portion is formed on the end portions of said pointer receiving member, and rotation of said pointer arresting member is initiated by a partial movement of said shutter release member.

6. Apparatus as in claim 1 wherein said pointer locking means further includes a pointer receiver member fixedly mounted to said camera body in opposing relationship to said pointer arresting member, said sloping edge at each end portion is formed on the end portions of said pointer arresting member, and rotation of said pointer arresting member is initiated by a partial movement of said shutter release member, and wherein said pointer arresting member further includes a projecting arm having means for engaging said shutter release member to prevent movement thereof, one of said sloping edges engaging said pointer only at said two extreme position ranges each outside of said range of movement whereby said pointer arresting member rotates to enable said means for engaging to engage said shutter release member and whereby rotation of said pointer arresting member is prevented with said pointer in said range of movement.

* * * * *